(12) United States Patent
Ishida

(10) Patent No.: US 6,758,646 B1
(45) Date of Patent: Jul. 6, 2004

(54) STRUCTURE FOR PREVENTING LOOSENING OF THREADED FASTENERS

(76) Inventor: Eisuke Ishida, 10-2-101, Higashiyamacho, Ashiya-shi, Hyogo 659-0081 (JP)

( * ) Notice: Subject to any disclaimer, the term of this patent is extended or adjusted under 35 U.S.C. 154(b) by 0 days.

(21) Appl. No.: 10/018,949
(22) PCT Filed: May 21, 2001
(86) PCT No.: PCT/JP01/04220
§ 371 (c)(1), (2), (4) Date: Mar. 5, 2002
(87) PCT Pub. No.: WO01/88391
PCT Pub. Date: Nov. 22, 2001

(30) Foreign Application Priority Data

May 19, 2000 (JP) ........................ 2000-186970
Jun. 2, 2000 (JP) ........................ 2000-165447

(51) Int. Cl.[7] ............... F16B 39/10; F16B 39/24
(52) U.S. Cl. .................... 411/119; 411/136; 411/149
(58) Field of Search ................. 411/119, 120, 411/121, 128, 130, 131, 149, 150, 136, 169

(56) References Cited

U.S. PATENT DOCUMENTS 1,269,059 A * 6/1918 D'Arden ............... 411/120 X
1,467,688 A * 9/1923 Sartain ..................... 411/136
2,141,701 A 12/1938 Uherkovich
5,080,545 A 1/1992 McKinlay
5,158,409 A 10/1992 Ishida

FOREIGN PATENT DOCUMENTS

GB 127427 * 6/1919 ................ 411/120
JP 02138511 5/1990
JP 04244616 9/1992

* cited by examiner

Primary Examiner—Neill Wilson
(74) Attorney, Agent, or Firm—J.C. Patents

(57) ABSTRACT

A first washer is disposed on an upper surface of a member to be tightened and its projecting portion is inserted into a clearance formed between a trunk of a bolt and a piercing hole of the member to be tightened. A second washer is disposed on an upper surface of the first washer and its claw portion is met with engaging teeth of the first washer. A head portion of the bolt is fitted into a fitting portion of the second washer. The first washer and the second washer are allowed to relatively rotate in a direction of tightening the bolt which is achieved by the claw portion sliding along sloped wall surfaces of the engaging teeth and are prevented from relative rotation in a direction of loosening the bolt which is achieved by the claw portion engaging with substantially vertical wall surfaces of the engaging teeth. The bolt may not be rotated though one should try to rotate the bolt in the loosening direction after tightening since the second washer is prevented from relatively rotating with respect to the first washer in this direction.

6 Claims, 12 Drawing Sheets

# STRUCTURE FOR PREVENTING LOOSENING OF THREADED FASTENERS

BACKGROUND OF THE INVENTION

The present invention relates to a structure for preventing loosening of bolts or nuts after tightening in a screw-fastening tool for tightening a plurality of members together by using bolts or a set of bolts and nuts.

Bolts prevented from loosening through application of adhesive on screw portions of bolts or nuts prevented from loosening such as Hard Locks (trade name) or U-nuts (trade name) are conventionally known to be commercially available. However, such products are arranged in that bolts or nuts are particularly treated or processed and are not adaptable for bolts or nuts of standard type.

Structures have further been proposed for preventing loosening of nuts in which slip surfaces are formed on bearing surfaces of nuts or surfaces of washers such that oscillations of members to be tightened or movements of the members to be tightened caused through thermal expansion/shrinkage are prevented from being transmitted to the nuts. However, since large pressure is applied on bearing surfaces of nuts, costs involved for forming slip surfaces capable of standing such pressure would lead to higher manufacturing costs.

In another known structure, square portions are integrally formed on trunks of bolts while piercing holes of members to be tightened are formed to be of noncircular shape that fit the square portions of the trunks. Since the fit between the square portions of trunks and the noncircular piercing holes will restrain rotation of bolts, it will be unnecessary to fix head portions of the bolts by using wrenches or similar in case the nuts are to be tightened. Thus, tightening operations can be easily performed when employing this structure. On the other hand, such a structure is not applicable to screw-fastening tools in which bolts need to be rotated for the tightening as in screw-fastening tools in which, for instance, a bolt is pierced through a piercing hole of one member to be tightened whereupon this bolt is screwed into a screw hole of another member to be tightened to achieve tightening.

A structure has been suggested in which a protrusion is integrally formed on a trunk of a bolt whereupon this protrusion is inserted into a clearance formed between a circular piercing hole of a member to be tightened and the trunk of the bolt (See Japanese Examined Patent Publication No. 2-114742(1990) and U.S. Pat. No. 5,158,409). The protrusion of the bolt has a height that is larger than ½ of a difference between a diameter of the trunk and a diameter of the piercing hole so that the bolt eccentrically rotates when rotating within the piercing hole with the center being somewhat shifted from a central axis of the trunk, thus making a head portion of the bolt slide on a bearing surface while continuously being shifted in a lateral direction. On the other hand, tightening the nut upon screwing the nut into the bolt will result in a larger sliding resistance between the head portion and the bearing surface of the bolt so that the bolt is not allowed to further move upon shifting in lateral directions whereupon the rotation of the bolt will be terminated. Thus, using a bolt formed with such a protrusion will eliminate the necessity of fixing the head portion of the bolt by means of a wrench or the like when tightening the nut to thus enable easy tightening operations. However, in case it is necessary to rotate the bolt around a central axis of the trunk for the tightening as it is the case with a screw-fastening tool in which the bolt is pierced through a circular piercing hole of one member to be tightened whereupon this bolt is screwed into a screw hole of another member to be tightened to achieve tightening, since the one member to be tightened will be shifted and moved through the protrusion of the bolt each time the bolt is rotated so that it is impossible to perform tightening operations.

SUMMARY OF THE INVENTION

It is an object of the present invention to provide a structure for preventing loosening that is also applicable to bolts or nuts of standard type.

It is another object of the present invention to provide a structure for preventing loosening that can be obtained at relatively low costs.

It is still another object of the present invention to provide a structure for preventing loosening that is applicable to screw-fastening tools of various structures.

It is still another object of the present invention to provide a structure for preventing loosening with which it is possible to achieve effects of preventing loosening without requiring any special processes or operations after tightening.

For achieving the above object, the present invention provides a structure for preventing loosening of a screw-fastening tool comprising a first member including a piercing hole, a second member including a screw hole, and a bolt including a head portion and a trunk, wherein the first member and the second member are tightened together by inserting the trunk of the bolt through the piercing hole of the first member, screwing the same into the screw hole of the second member and tightening the bolt, wherein a washer is disposed between the head portion of the bolt and the first member, the washer including a projecting portion that is inserted into a clearance formed between the trunk of the bolt and the piercing hole of the first member, wherein the bolt and the washer are allowed to relatively rotate during tightening of the bolt while the bolt and the washer are prevented from relatively rotating in a direction of loosening the bolt after tightening of the bolt.

The present invention further provides a structure for preventing loosening of a screw-fastening tool comprising a first member including a piercing hole, a second member including a screw hole, and a bolt including a head portion and a trunk, wherein the first member and the second member are tightened together by inserting the trunk of the bolt through the piercing hole of the first member, screwing the same into the screw hole of the second member and tightening the bolt, wherein a first and a second washer are disposed between the head portion of the bolt and the first member, the first washer including a projecting portion that is inserted into a clearance formed between the trunk of the bolt and the piercing hole of the first member, and the second washer including a fitting portion that fits with the head portion of the bolt, wherein the first and the second washer are allowed to relatively rotate during tightening of the bolt while the first and the second washer are prevented from relatively rotating in a direction of loosening the bolt after tightening of the bolt.

The above structure for preventing loosening is also applicable to a nut in a screw-fastening tool comprising a plurality of members including piercing holes, a bolt including a head portion and a trunk, and a nut, wherein the trunk of the bolt is passed through the piercing holes of the plurality of members prior to screwing the same to the nut for tightening the nut in order to tighten the plurality of members together.

Since the present invention is arranged to prevent loosening by means of washers disposed on bearing surfaces of bolts or nuts, the present invention is also applicable to bolts or nuts of standard type such that manufacturing costs may be kept relatively low. It is also applicable to screw-fastening tools employing bolts or to screw-fastening tools employing sets of bolts and nuts. It is possible to exhibit loosening preventing effects without the necessity of performing any particular processing or operation after tightening. Economical advantages may be achieved since the washers may be used instead of ordinary washers.

BRIEF DESCRIPTION OF THE DRAWINGS

FIGS. 1 and 2 illustrate a first embodiment of the present invention, wherein FIG. 1 illustrates a condition after completion of tightening and FIG. 2 a condition at the time of tightening.

FIG. 5 illustrates a third embodiment of the present invention, wherein

FIG. 8 illustrates a washer according to the fifth embodiment, wherein

FIGS. 14 and 15 illustrate a ninth embodiment of the present invention, wherein FIG. 14 illustrates a condition after completion of tightening and FIG. 15 a condition at the time of tightening.

PREFERRED EMBODIMENT OF THE INVENTION

Embodiments of the present invention will now be explained.

Figure 1A:
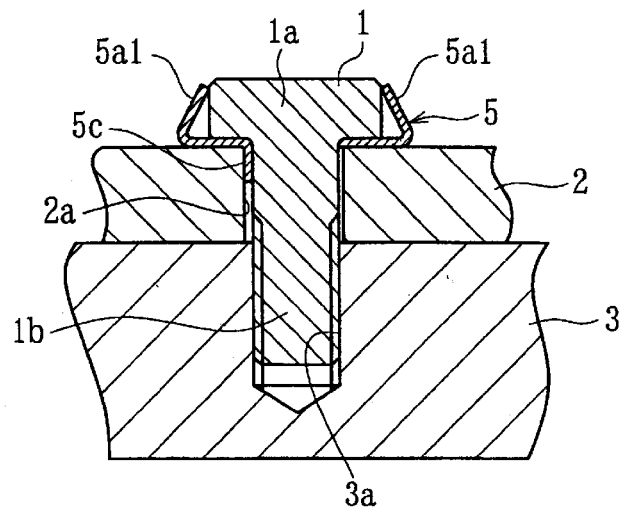
FIGS. 1a and 2a are longitudinal sectional views, FIGS. 1b and 2b plan views seen from above, and FIGS. 1c and 2c vertical sectional views cut at a position of a projecting portion of a washer.
Figure 1B:
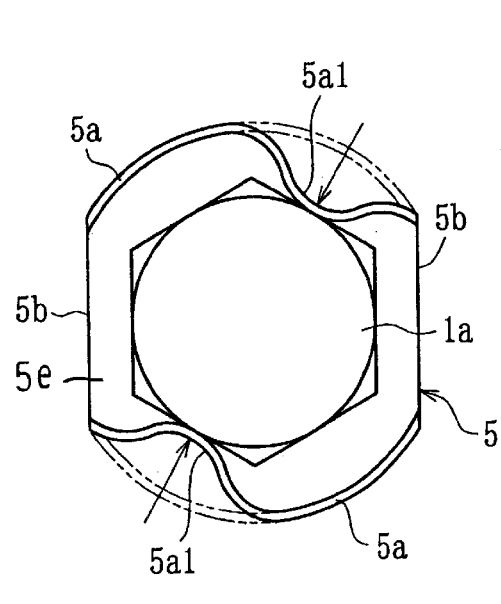
Figure 1C:
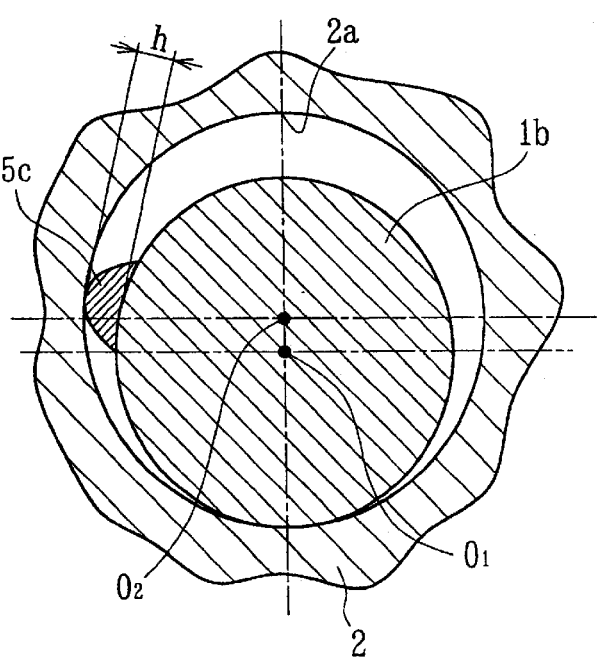
Figure 2A:
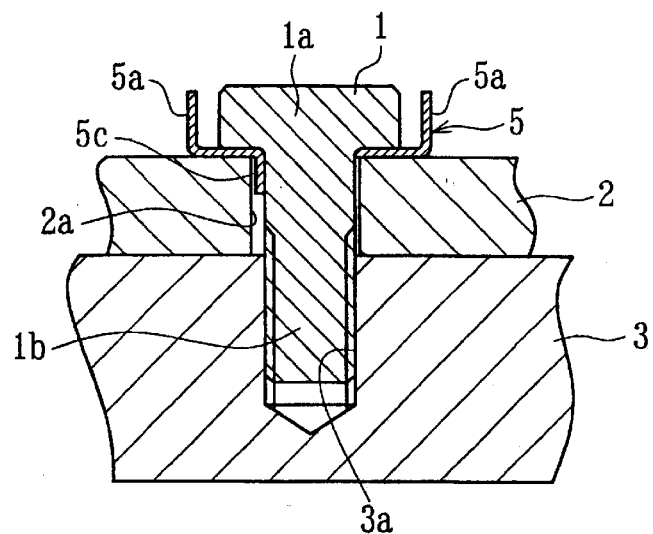
Figure 2B:
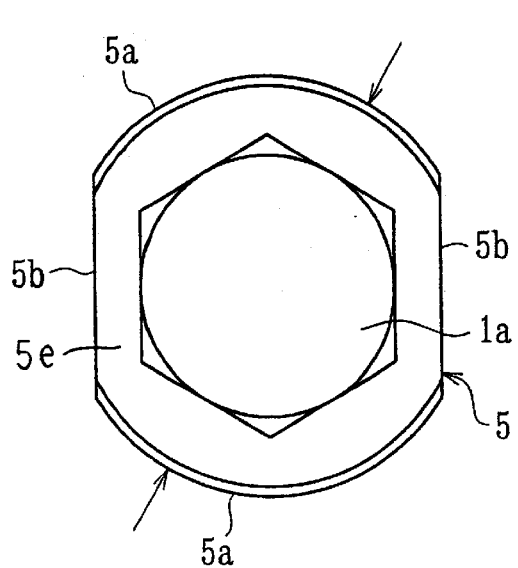

FIGS. 1 and 2 illustrate a first embodiment of the present invention. FIG. 1 illustrates a condition after completion of tightening and FIG. 2 a condition at the time of tightening.

Figure 2C:
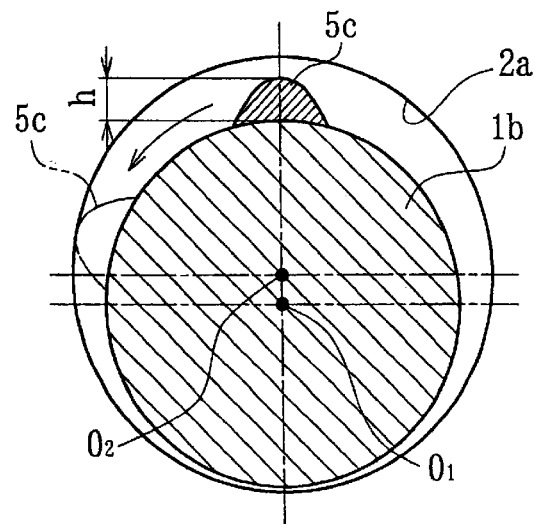
Figure 3:
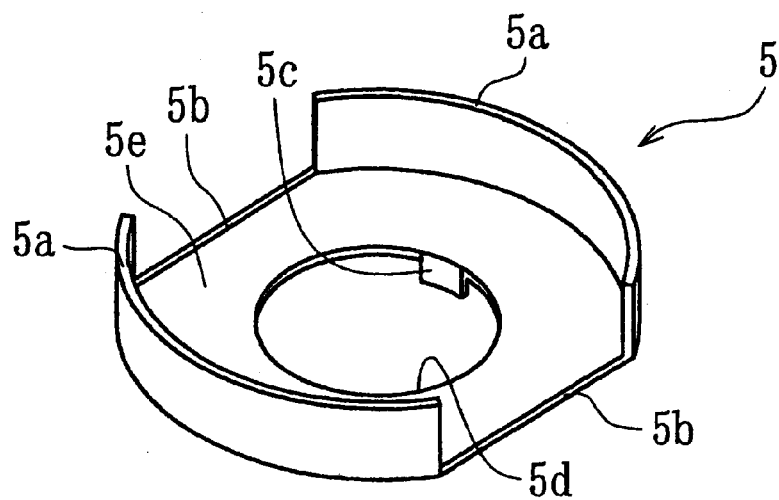
FIG. 3 is a perspective view of the washer according to the first embodiment.

In FIG. 2, a trunk 1b of a bolt 1 pierces through a circular piercing hole 2a of a member 2 to be tightened and is screwed into a screw hole 3a of a member 3 to be tightened. A head portion 1a of the bolt 1 is of hexagonal shape and a washer 5 is interposed between a bearing surface thereof and an upper surface of the member 2 to be tightened. The washer 5 is formed upon stamping, for instance, a metallic plate as illustrated in FIG. 3 and comprises a flat plate portion 5e, a pair of arc-like rising portions 5a rising upward from an edge of the flat plate portion 5e, a pair of linear engaging portions 5b provided on the edge of the flat plate portion 5e, a hole 5d formed in the center of the flat plate portion 5e, and a projecting portion 5c projecting downward from an inner edge of the hole 5d.

The flat plate portion 5e of the washer 5 is interposed between the head portion 1a of the bolt 1 and the upper surface of the member 2 to be tightened. The projecting portion 5c of the washer is inserted into a clearance formed between the trunk 1b of the bolt 1 and the piercing hole 2a of the member 2 to be tightened. As shown in FIG. 2c, a height h of the projecting portion 5c is larger than ½ of a difference between a diameter of the trunk 1b and a diameter of the piercing hole 2a, and a center of axis 01 of the trunk 1b is thus shifted from the center 02 of the piercing hole 2a, and the clearance between the trunk 1b and the piercing hole 2a is of wedged-shape in which it becomes gradually smaller in approaching both sides in a rotating direction. Each rising portion 5a of the washer 5 is lower than a height of the head portion 1a of the bolt 1 and is located so as not to interfere the head portion 1a. Thus, the bolt 1 may still be relatively rotated with respect to the washer 5 in this condition.

Tightening of the members 2 and 3 to be tightened is performed in the following manner. The hole 5d of the washer 5 is first put against the piercing hole 2a of the member 2 to be tightened (the projecting portion 5c is inserted into the piercing hole 2a) whereupon the trunk 1b of the bolt 1 is passed through the hole 5d of the washer 5 and the piercing hole 2a of the member 2 to be tightened to be screwed at the screw hole 3a of the member 3 to be tightened. The bolt 1 is then rotated into a tightening direction for screwing a screw portion of the trunk 1b into the screw hole 3a of the member 3 to be tightened and accordingly tightening the members 2 and 3 to be tightened together. Since the bolt 1 and the washer 5 may be relatively rotated in this condition, the bolt 1 rotates within the piercing hole 2a around the center of axis 01 of the trunk 1b without being restrained by the washer 5. Thus, tightening may be performed just like with an ordinary bolt. After tightening the members 2 and 3 to be tightened through the bolt 1, the engaging portions 5b of the washer 5 are engaged using a suitable tool while pressurizing the head portion 1a of the bolt 1 by a suitable tool, and as shown in FIG. 2c, the washer 5 is then rotated in a direction of loosening the bolt 1 (counter-clockwise in the drawing) for press-fitting the projecting portion 5c into the wedge-like clearance in this direction.

Thereafter, the rising portions 5a of the washer are swaged as shown in FIG. 1 and the swaged portions 5a1 are engaged with an outer periphery of the head portion 1a of the bolt 1. In this manner, the bolt 1 and the washer 5 are integrated such that they cannot be relatively rotated and loosening of the bolt 1 is prevented by the washer 5. More particularly, as shown in FIG. 1c, in order for the bolt 1 to rotate in a loosening direction (counter-clockwise direction in the drawing) with the bolt 1 and the washer 5 being integrated and the projecting portion 5c of the washer 5 contacting an inner periphery of the piercing hole 2a, it needs to rotate around the center 02 of the piercing hole 2a while being eccentric (the presence of the projecting portion 5c prevents it to rotate around the center 01 of the trunk 1b).

Figure 13A:
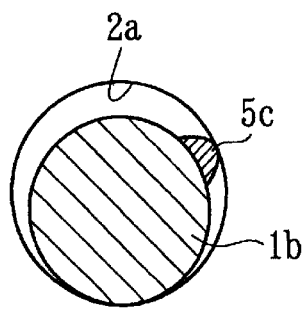
FIG. 13 is a vertical sectional view illustrating a shape of a projecting portion of a washer.
Figure 13B:
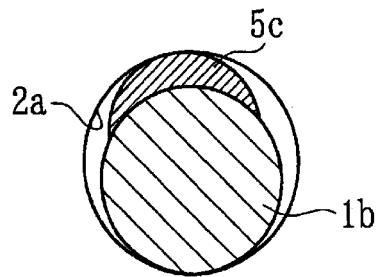

On the other hand, in order for the bolt 1 to rotate in an eccentric manner, the flat plate portion 5e of the washer 5 needs to slide with respect to the bearing surface of the head portion 1a and the upper surface of the member 3 to be tightened while the flat plate portion 5e cannot perform sliding movements since tightening force is applied onto the bolt 1. The bolt 1 is thus not allowed to rotate in a loosening direction so that loosening thereof is prevented. It should be noted that the projecting portion 5c of the washer 5 might be dimensioned to be short in a circumferential direction as shown in FIG. 13a or to be long in the circumferential direction as shown in FIG. 13b. By employing the shape as shown in FIG. 13b, a rotational angle in a loosening direction for the bolt 1 may be reduced.

Figure 4:
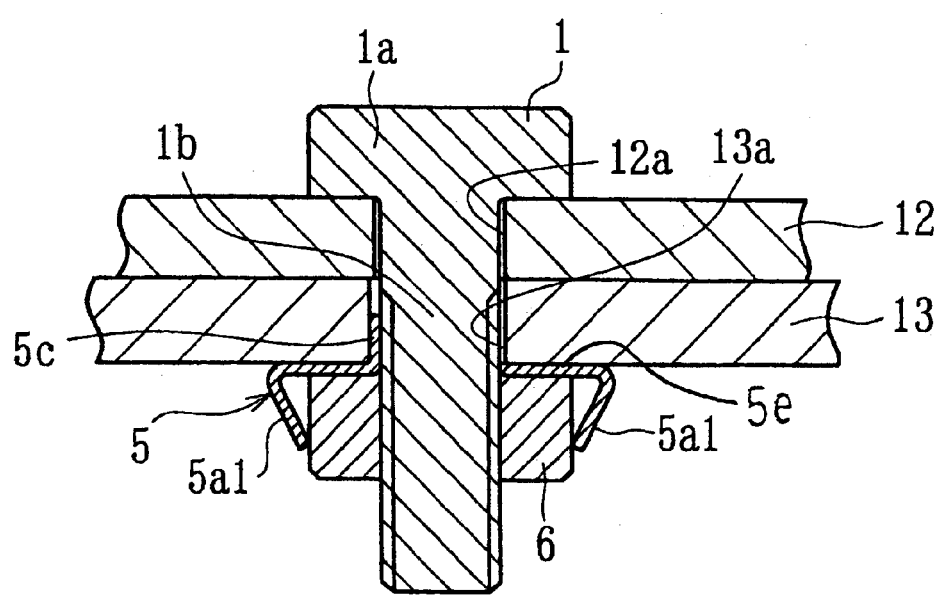
FIG. 4 is a longitudinal sectional view illustrating a second embodiment of the present invention.

FIG. 4 illustrates a second embodiment of the present invention. This embodiment is arranged in that the washer 5 of the first embodiment is applied to a nut 6. The trunk 1b of the bolt 1 pierces through a circular piercing hole 12a of a member 12 to be tightened and a circular piercing hole 13a of a member 13 to be tightened to be screwed into the hexagonal nut 6. The flat plate portion 5e of the washer 5 is interposed between a bearing surface of the nut 6 and a lower surface of the member 13 to be tightened.

The nut 6 is rotated in a tightening direction for screwing the same into the screw portion of the trunk 1b of the bolt 1 for tightening the members 12 and 13 to be tightened together. Thereafter, a suitable tool is engaged with the engaging portions 5b of the washer 5 while pressing the nut 6 by a suitable tool, and the washer 5 is rotated in a direction for loosening the nut 6 such that the projecting portion 5c is press-fitted into a wedge-like clearance between the trunk 1b and the piercing hole 13a. The rising portions 5a of the washer 5 are swaged and the swaged portions 5a1 are engaged with an outer periphery of the nut 6 for integrating the nut 6 and the washer 5. Since the nut 6 and the washer 5 may be relatively rotated at the time of tightening, tightening may be performed just like with an ordinary nut, and after integrating the nut 6 and the bolt 5 such that they may not be relatively rotated, loosening of the nut 6 is prevented by the washer 5. The remaining matters apply correspondingly to the first embodiment.

Figure 5A:
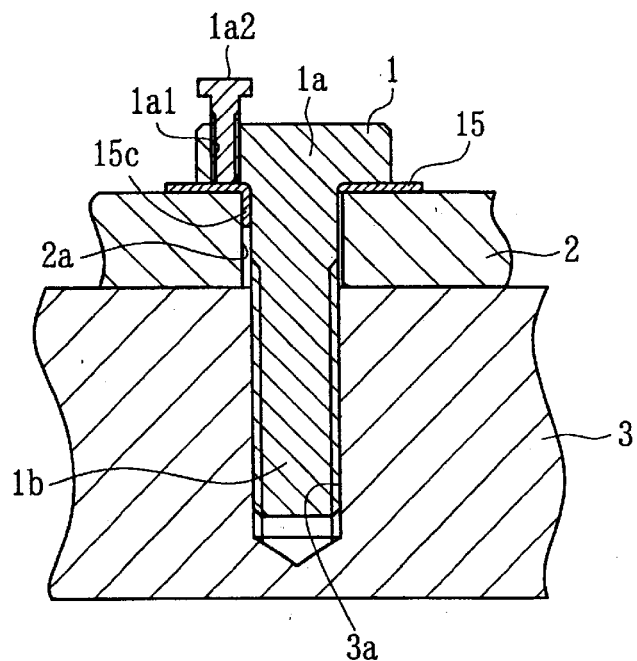
FIG. 5a is a longitudinal sectional view, FIG. 5b a plan view seen from above, and FIG. 5c a perspective view of a washer.
Figure 5B:
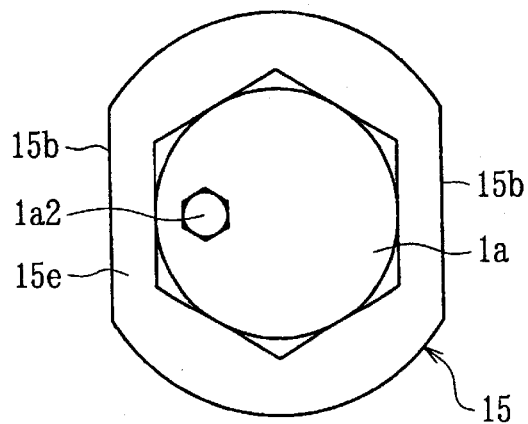
Figure 5C:
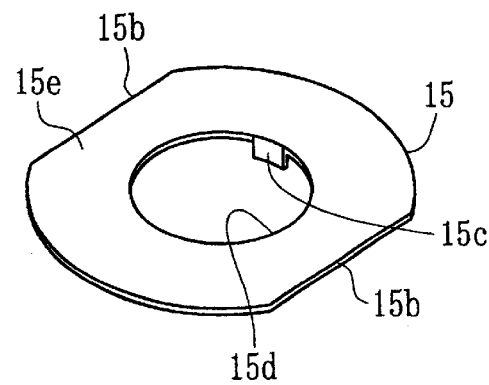

FIG. 5 illustrates a third embodiment. This embodiment is arranged in that the bolt 1 and a washer 15 are prevented from relative rotation through a screw 1a2 after tightening of the bolt 1. The screw 1a2 is screwed into a screw hole 1a1 provided on the head portion 1a of the bolt 1. Relative rotation of both members is prevented through a tip end of the screw 1a2 press-contacting the washer 15. As shown in FIG. 5c, the washer 15 of the present embodiment may be formed by, for instance, stamping a metallic plate, and comprises a flat plate portion 15e, a pair of linear engaging portions 15b provided on an edge of the flat plate portion 15e, a hole 15d formed in the center of the flat plate portion 15e, and a projecting portion 15c projecting downward from an inner edge of the hole 15d. The remaining matters apply correspondingly to the first embodiment.

Figure 6:
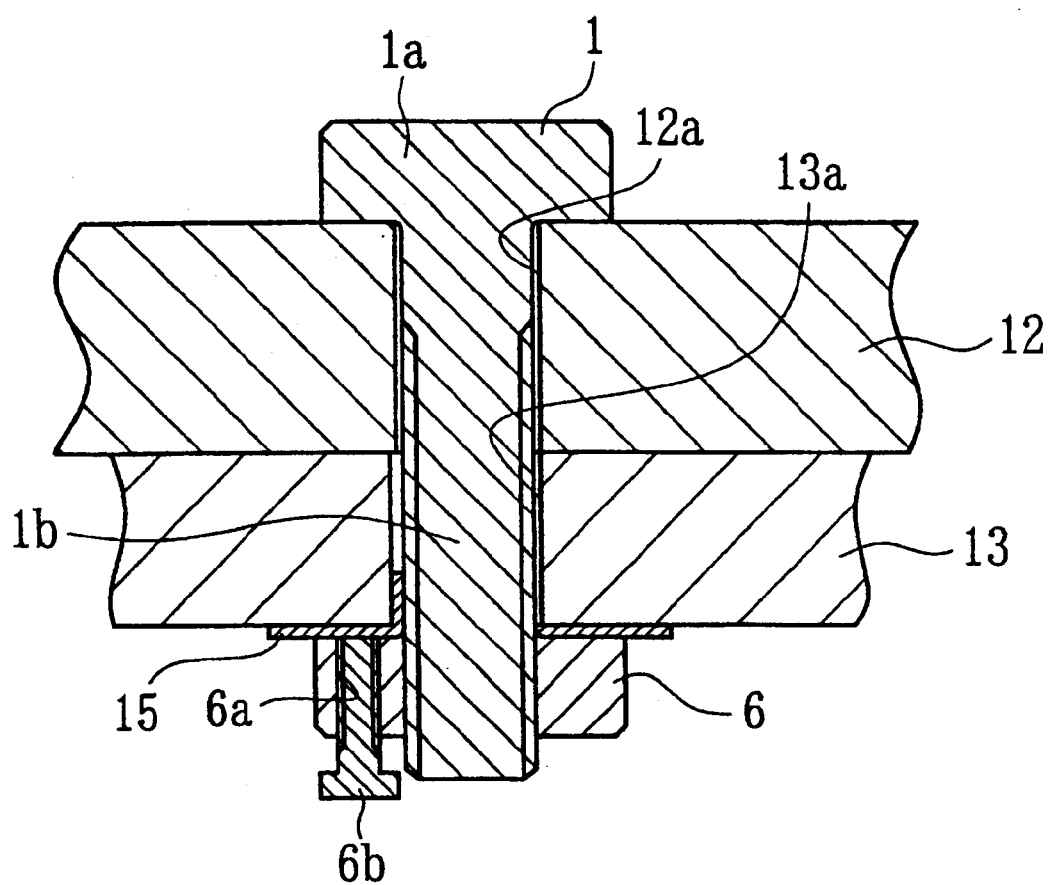
FIG. 6 is a longitudinal sectional view illustrating a fourth embodiment of the present invention.

FIG. 6 illustrates a fourth embodiment. This embodiment is arranged in that the washer 15 of the third embodiment is applied to the nut 6. A screw 6b is screwed into a screw hole 6a provided in the nut 6. The remaining matters apply correspondingly to the first to third embodiments.

Figure 7:
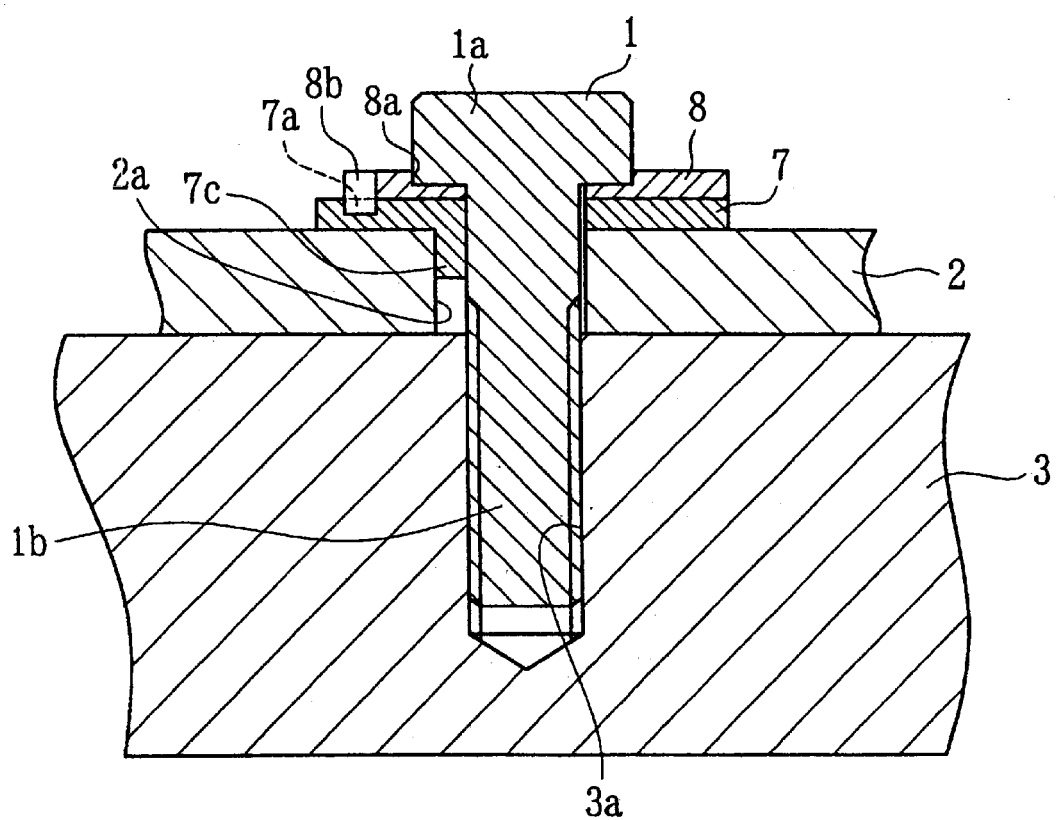
FIG. 7 is a longitudinal sectional view illustrating a fifth embodiment of the present invention.
Figure 8A:
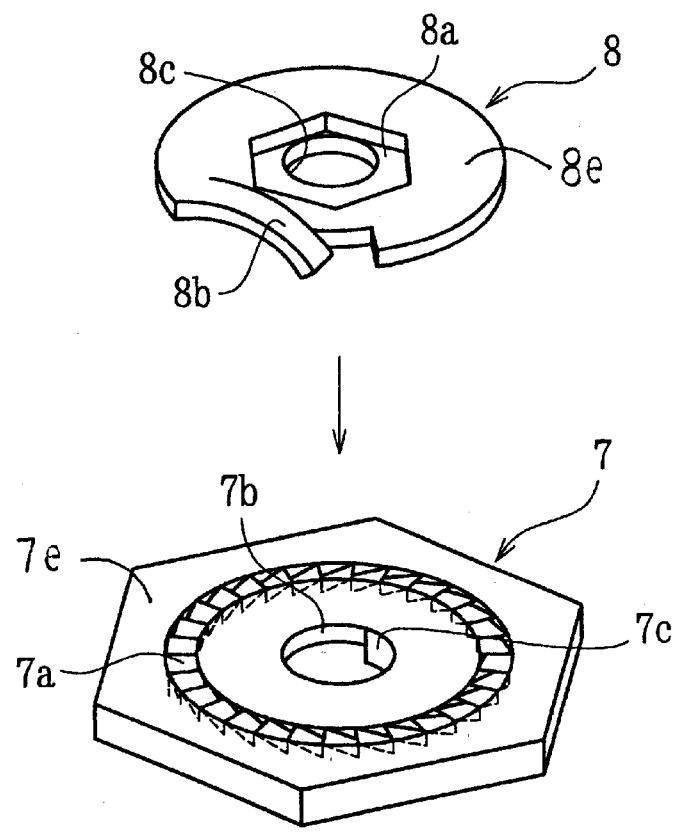
FIG. 8a is a perspective view and FIG. 8b a partially enlarged perspective view.
Figure 8B:
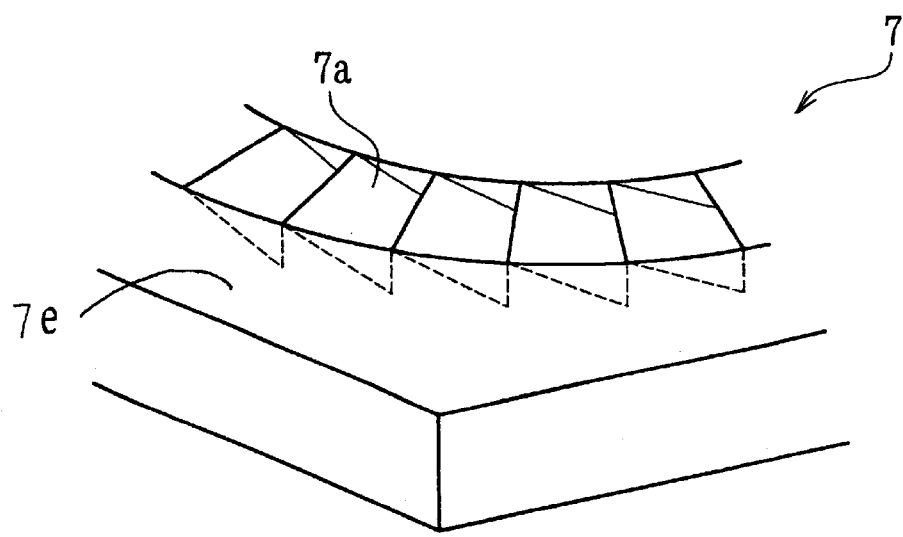

FIG. 7 illustrates a fifth embodiment. This embodiment is arranged in that the washer is comprised of a first washer 7 and a second washer 8. As illustrated in FIG. 8, the washer 7 is formed by, for instance, stamping a metallic plate and comprises a flat plate portion 7e, multiple engaging teeth 7a provided on an edge portion of an upper surface of the flat plate portion 7e, a hole 7d formed in the center of the flat plate portion 7e, and a projecting portion 7c projecting downward from an inner edge of the hole 7d. The multiple engaging teeth 7a are aligned in an annular manner, and as shown in FIG. 8b in enlarged form, each tooth comprises a substantially vertical wall surface and a gently sloped wall surface. The trunk 1b of the bolt 1 is pierced through the hole 7d. The washer 8 is formed by, for instance, stamping a metallic plate and includes a flat plate portion 8e, a claw portion 8b formed through notching an edge portion of the flat plate portion 8e, a hexagonal concave fitting portion 8a provided in the center of an upper surface of the flat plate portion 7e and a hole 8c formed in the center of the fitting portion 8a. The flat plate portion 7e is of hexagonal shape and its linear edge forms an engaging portion to engage with a suitable tool. The claw portion 8b is elastically displaceable in vertical directions with respect to the flat plate portion 8e. The claw portion 8b is shaped to be somewhat warped so that its tip end slightly projects from a lower surface of the flat plate portion 8e in a normal condition. The head portion 1a of the bolt 1 is fitted into the fitting portion 8a and the trunk 1b of the bolt 1 is pierced into the hole 8c.

As shown in FIG. 7, the washer 7 is disposed on the upper surface of the member 2 to be tightened, and its projecting portion 7c is inserted into a clearance formed between the trunk 1b of the bolt 1 and the piercing hole 2a of the member 2 to be tightened. The washer 8 is disposed on the upper surface of the washer 7 and a tip end portion of its claw portion 8b is made to meet the engaging teeth 7a. The head 1a of the bolt 1 is fitted into the fitting portion 8a of the washer 8. The washers 7 and 8 may be relatively rotated in a direction of tightening the bolt 1 which is achieved by the claw portion 8b sliding on the sloped wall surfaces of the engaging teeth 7a but may not be relatively rotated in a direction of loosening the bolt 1 which is achieved by the claw portion 8b engaging with the substantially vertical wall surfaces of the engaging teeth 7a. Thus, tightening may be performed just like with an ordinary bolt by rotating the bolt 1 together with the washer 8 in the tightening direction at the time of tightening. On the other hand, the bolt 1 is not allowed to rotate since the washer 8 may not be relatively rotated in the same direction after tightening even though one should try to rotate the bolt 1 in the loosening direction. It is accordingly possible to prevent loosening of the bolt 1. It should be noted that it is possible to loosen and remove the bolt 1 without causing any damages to the washers 7 and 8 by elastically displacing the claw portion 8b of the washer 8 in an upward direction through a suitable tool for releasing the engagement with the engaging teeth 7a. The removed washers 7 and 8 may be reused as they are. The structure for preventing loosening according to the present embodiment is also applicable to the nut side of a screw-fastening tool as shown in FIG. 4 or 6 (a screw-fastening tool arranged to tighten members to be tightened together through a set of a bolt and a nut). The remaining matters apply correspondingly to the first embodiment.

Figure 9:
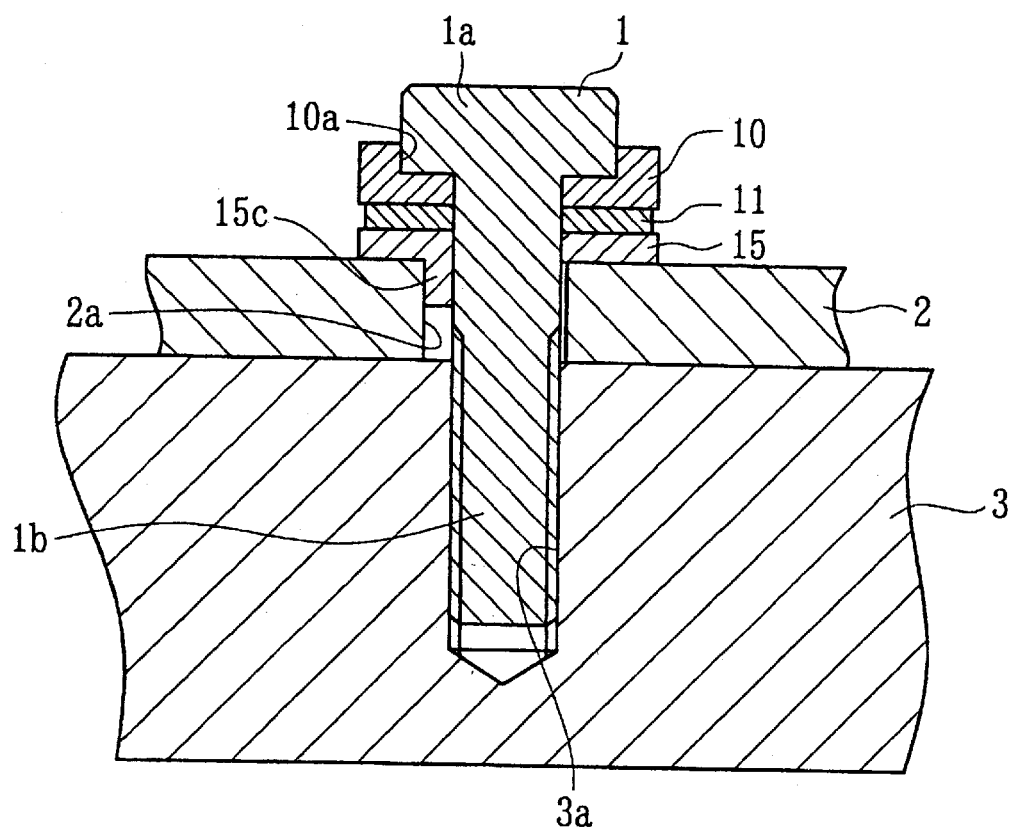
FIG. 9 is a longitudinal sectional view illustrating a sixth embodiment of the present invention.

FIG. 9 illustrates a sixth embodiment of the present invention. This embodiment is arranged in that the washer is comprised of a first washer 15 and a second washer 10 with an adhesive capsule 11 being interposed between both members. The washer 15 is identical to that as illustrated in FIG. 5c. The washer 10 is arranged in that a hexagonal concave fitting portion 10a is provided in the center of an upper surface of the flat plate portion. The head 1a of the bolt 1 is fitted into the fitting portion 10a. The adhesive capsule 11 is an annular member including a hole through which the trunk 1b of the bolt 1 is pierced. When rotating the bolt 1 together with the washer 10 in the tightening direction, the adhesive capsule 11 is compressed and broken such that an adhesive sealed in its interior is filled between the washer 10 and the washer 15. Upon curing of the adhesive after tightening of the bolt 1, the washer 10 and the washer 15 are integrated such that they may not be relatively rotated and thus to prevent loosening of the bolt 1. It should be noted that the structure for preventing loosening according to the present embodiment is also applicable to the nut side of a screw-fastening tool as illustrated in FIG. 4 or 6 (a screw-fastening tool arranged to tighten members to be tightened together through a set of a bolt and a nut). The remaining matters apply correspondingly to the first, third and fifth embodiments.

Figure 10:
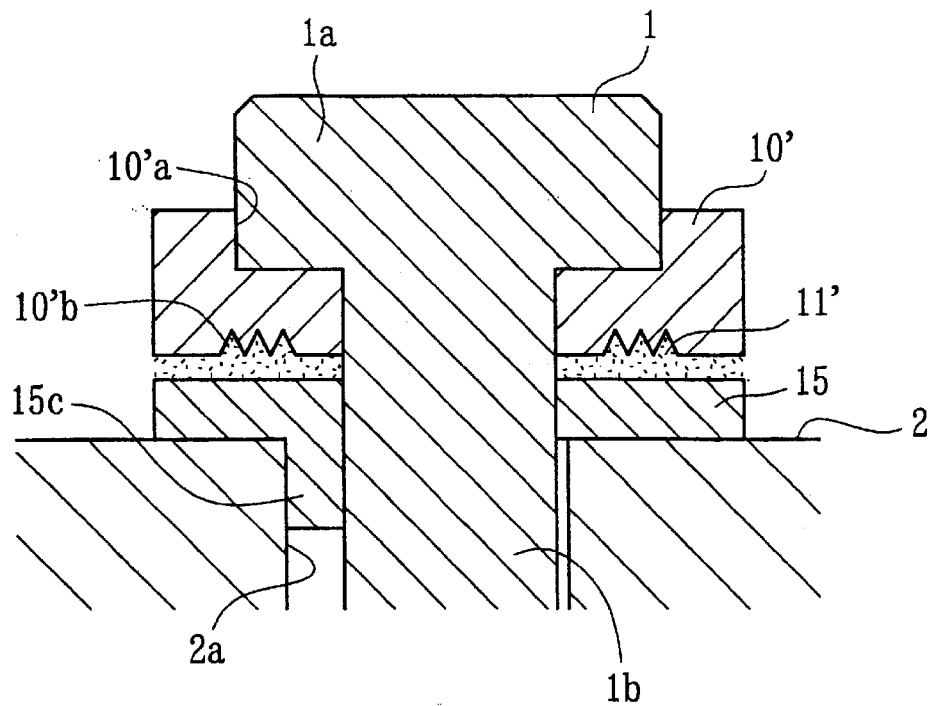
FIG. 10 is a longitudinal sectional view illustrating a seventh embodiment of the present invention.

FIG. 10 illustrates a seventh embodiment of the present invention. This embodiment is arranged in that the washer is comprised of a first washer 15 and a second washer 10' with an adhesive 11' being interposed between both members. The present embodiment is further arranged in that a concave adhesive holding portion 10'b is provided on a lower surface (opposing surface) of the washer 10'. Upon curing of the adhesive 11' after tightening of the bolt 1, the washer 10' and the washer 15 are integrated such that they may not be relatively rotated and thus to prevent loosening of the bolt 1. Since the adhesive 11' is held by the concave adhesive holding portion 10'b, adhesive force may be strengthened. It should be noted that the structure for preventing loosening according to the present embodiment is also applicable to the nut side of a screw-fastening tool as shown in FIG. 4 or 6 (a screw-fastening tool arranged to tighten members to be tightened together through a set of a bolt and a nut). The remaining matters apply correspondingly to the first, third, fifth and sixth embodiments.

Figure 11:
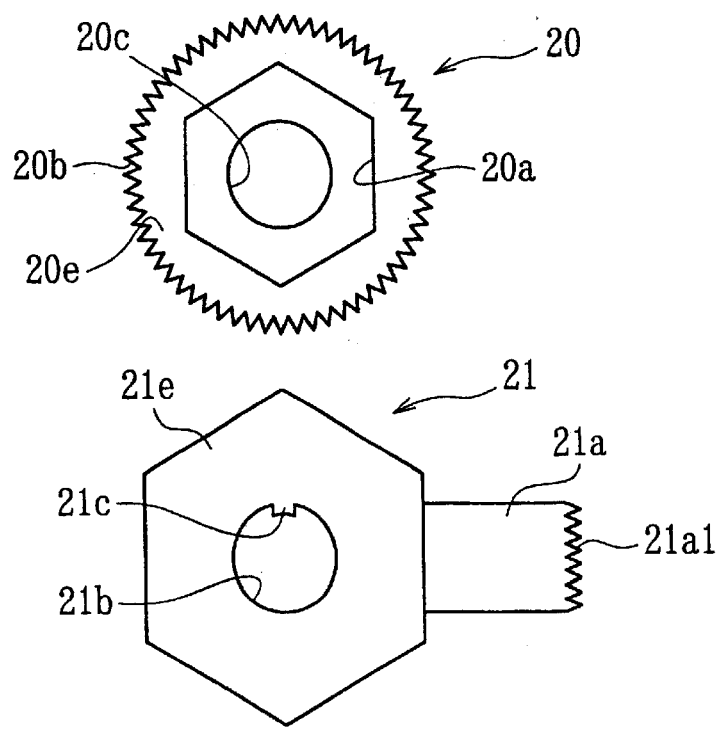
FIG. 11 is a plan view of a washer according to an eighth embodiment.
Figure 12:
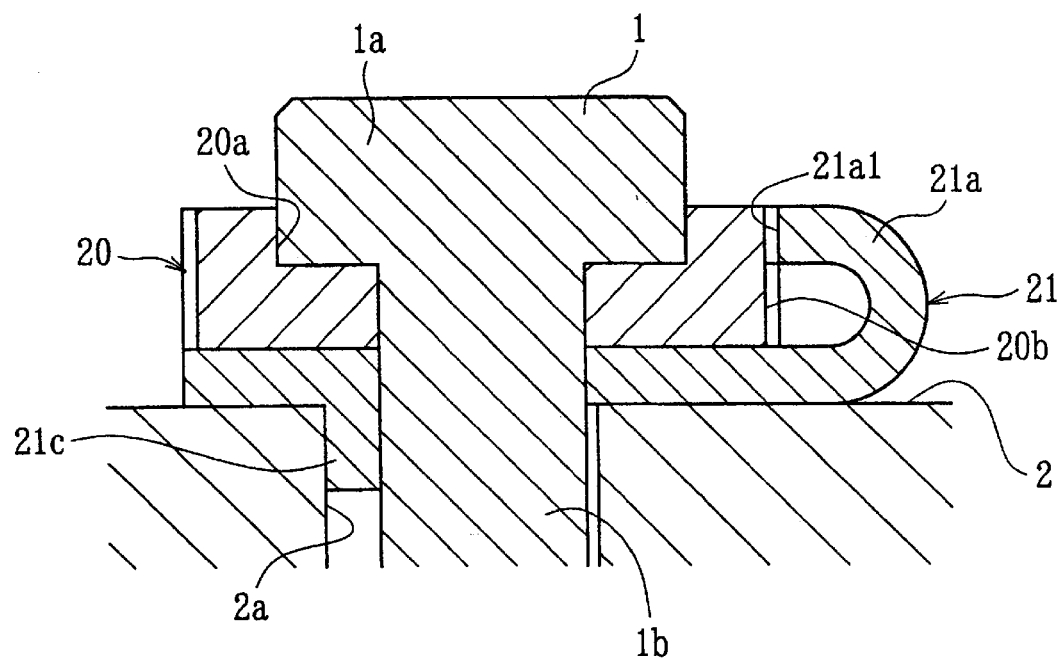
FIG. 12 is a longitudinal sectional view illustrating the eighth embodiment of the present invention.

FIG. 12 illustrates an eighth embodiment of the present invention. This embodiment is arranged in that the washer is comprised of a first washer 21 and a second washer 20. As shown in FIG. 11, the washer 21 is formed by, for instance, stamping a metallic plate and includes a flat plate portion 21e, a claw portion 21a projecting in an outer radial direction from an edge portion of the flat plate portion 21e, a hole 21b formed in the center of the flat plate portion 21e, and a projecting portion 21c projecting downward from an inner edge of the hole 21b. The flat plate portion 21e is of hexagonal shape and its linear edge forms an engaging portion to engage with a suitable tool. Engaging teeth 21a1 are formed at the tip of the claw portion 21a. The trunk 1b of the bolt 1 is pierced through the hole 21b. The washer 20 is formed by, for instance, stamping a metallic plate and comprises a flat plate portion 20e, engaging teeth 20b provided on an edge of the flat plate portion 20e, a hexagonal concave fitting portion 20a provided in the center of an upper surface of the flat plate portion 20e, and a hole 20c provided in the center of the fitting portion 20a. The head portion 1a of the bolt 1 is fitted into the fitting portion 20a and the trunk 1b of the bolt 1 is pierced through the hole 20c.

As shown in FIG. 12, the washer 21 is disposed on the upper surface of the member 2 to be tightened and its projecting portion 21c is inserted into a clearance formed between the trunk 1b of the bolt 1 and the piercing hole 2a of the member 2 to be tightened. The washer 20 is disposed on an upper surface of the washer 21. After tightening of the bolt 1, the claw portion 21a of the washer 21 is folded back for engaging its engaging teeth 21a1 with the engaging teeth 20b of the washer 20. In this manner, the washer 20 and the washer 21 are integrated so that they may not be relatively rotated for accordingly preventing loosening of the bolt 1. It should be noted that, though not illustrated in the drawings, a screw may be passed through the claw portion 21a and the same screw may be screwed into the flat plate portion 21a for preventing deformation through returning of the claw portion 21a after the folding. It should be noted that the structure for preventing loosening according to the present embodiment is also applicable to the nut side of a screw-fastening tool as shown in FIG. 4 or 6 (a screw-fastening tool arranged to tighten members to be tightened together through a set of a bolt and a nut). The remaining matters apply correspondingly to the first and the fifth embodiment.

Figure 14A:
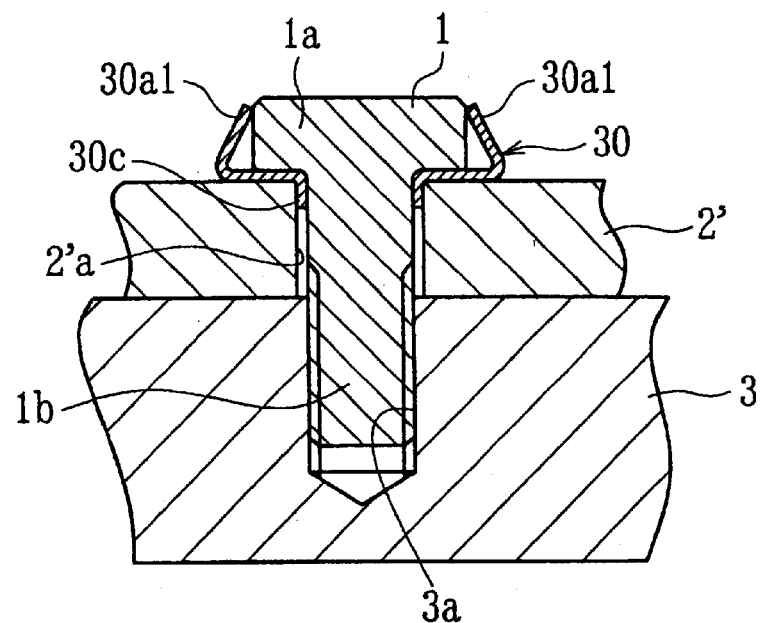
FIGS. 14a and 15a are longitudinal sectional views, FIGS. 14b and 15b plan views seen from above, and FIG. 15c vertical sectional view cut at a position of a projecting portion of a washer.
Figure 14B:
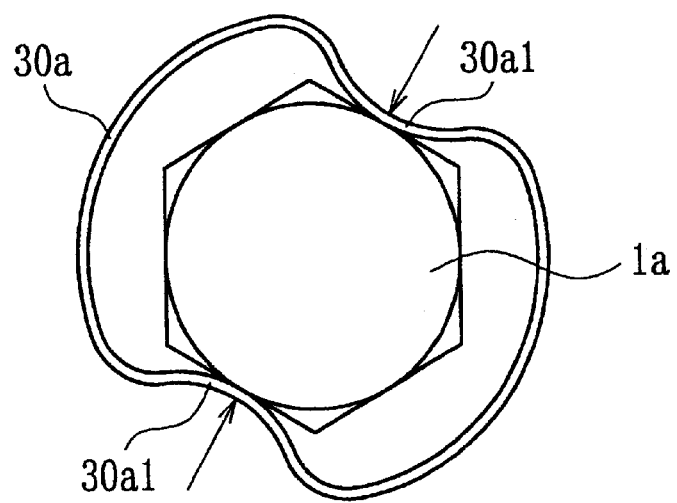
Figure 15A:
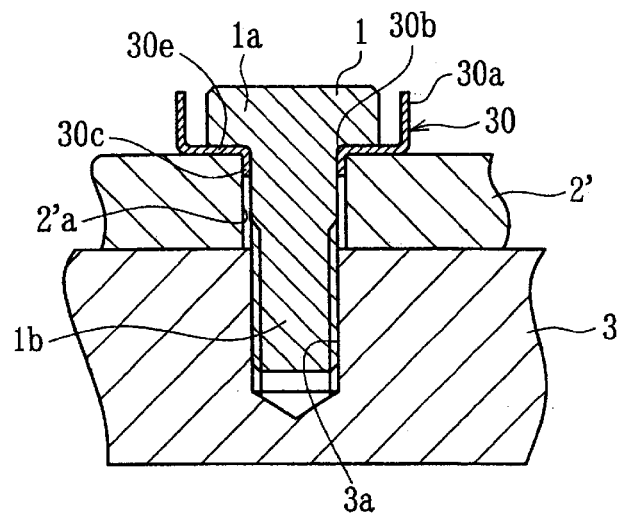
Figure 15B:
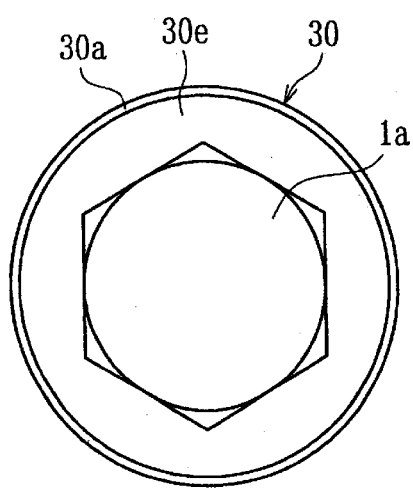
Figure 15C:
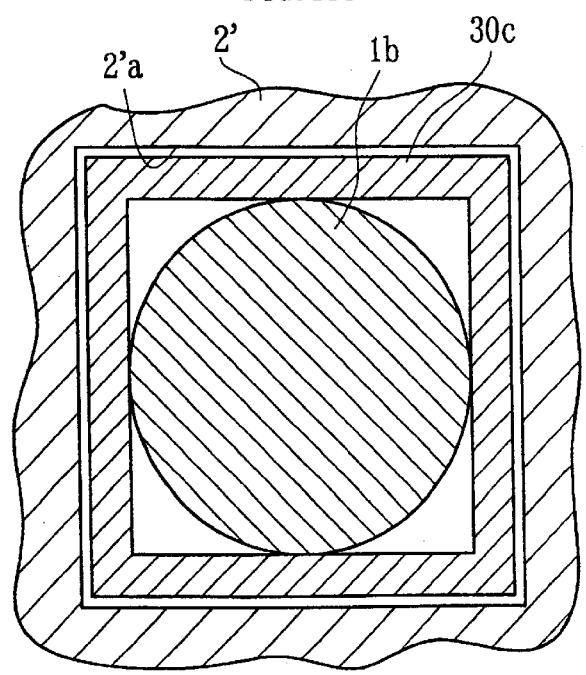

FIGS. 14 and 15 illustrate a ninth embodiment of the present invention. FIG. 14 illustrates a condition after completion of tightening and FIG. 15 a condition at the time of tightening.

In FIG. 15, the trunk 1b of the bolt 1 pierces through a noncircular piercing hole 2'a of a member 2' to be tightened and is screwed into the screw hole 3a of the member 3 to be tightened. A washer 30 is interposed between the bearing surface of the head portion 1a of the bolt 1 and an upper surface of the member 2' to be tightened. The washer 30 is formed upon stamping, for instance, a metallic plate and comprises a circular flat plate portion 30e, a rising portion 30a rising upward from an edge of the flat plate portion 30e, a noncircular hole 30b formed in the center of the flat plate portion 5e, and a noncircular cylindrical projecting portion 30c projecting downward from an inner edge of the hole 30d. In this embodiment, all of the piercing hole 2'a of the member 2' to be tightened, the hole 30b and the projecting portion 30c of the washer 30 are formed to be of square shape. The projecting portion 30c of the washer 30 is inserted into a clearance formed between the trunk 1b of the bolt 1 and the piercing hole 2'a of the member 2' to be tightened.

The flat plate portion 30e of the washer 30 is interposed between the bearing surface of the head portion 1a of the bolt 1 and the upper surface of the member 2' to be tightened. The projecting portion 30c of the washer 30 is inserted into a clearance formed between the trunk 1b of the bol 1 and the piercing hole 2'a of the member 2' to be tightened. The rising portion 30a of the washer 30 is lower than a height of the head portion 1a of the bolt 1 and is located so as not to interfere the head portion 1a. Thus, the bolt 1 may still be relatively rotated with respect to the washer 30 in this condition.

Tightening of the members 2' and 3 to be tightened is performed in the following manner. The hole 30b of the washer 30 is first put against the piercing hole 2'a of the member 2' to be tightened (the projecting portion 5c is inserted into the piercing hole 2'a) whereupon the trunk 1b of the bolt 1 is passed through the hole 30b of the washer 30 and the piercing hole 2'a of the member 2' to be tightened to be screwed at the screw hole 3a of the member 3 to be tightened. The bolt 1 is then rotated into the tightening direction for screwing a screw portion of the trunk 1b into the screw hole 3a of the member 3 to be tightened and accordingly tightening the members 2' and 3 to be tightened together. Since the bolt 1 and the washer 30 may be relatively rotated in this condition, the bolt 1 rotates without being restrained by the washer 30. Thus, tightening may be performed just like with an ordinary bolt.

After tightening the members 2' and 3 to be tightened through the bolt 1 in this manner, the rising portion 30a of the washer 30 is swaged as shown in FIG. 14 and the swaged portion 30a1 is engaged with an outer periphery of the head portion 1a of the bolt 1. In this manner, the bolt 1 and the washer 5 are integrated such that they cannot be relatively rotated. On the other hand, rotation of the washer 30 with respect to the member 2' to be tightened is prevented through the square cylindrical projecting portion 30c of the washer 30 engaging with the square piercing hole 2'a of the member 2' to be tightened in a rotating direction. Loosening of the bolt 1 is accordingly prevented through the washer 30. It should be noted that the shape of the projecting portion 30c of the washer 30 and that of the piercing hole 2'a of the member 2' to be tightened is not limited to a square shape but may be of any noncircular shape that may be engaged at least in a direction of loosening the bolt. Alternative means for preventing relative rotation between the bolt 1 and the washer 30 may be the structure as illustrated in the third embodiment employing a screw or the structures as illustrated in any one of the fifth to eighth embodiments employing first and second washers. The structure for preventing loosening according to the present embodiment is also applicable to the nut side of a screw-fastening tool as shown in FIG. 4 or 6 (a screw-fastening tool arranged to tighten members to be tightened together through a set of a bolt and a nut).

What is claimed is:

1. A structure for preventing loosening of a screw-fastening tool comprising a first member including a piercing hole, a second member including a screw hole, and a bolt including a head portion and a trunk, wherein the first member and the second member are tightened together by inserting the trunk of the bolt through the piercing hole of the first member, screwing the same into the screw hole of the second member and tightening the bolt, wherein a washer is disposed between the head portion of the bolt and the first member, the washer including a projecting portion that is inserted into a clearance formed between the trunk of the bolt and the piercing hole of the first member, a height of the projecting portion being larger than one-half of a difference between the diameter of the trunk of the bolt and the diameter of the piercing hole of the first member and being smaller than the difference, wherein the bolt and the washer are not integrated during tightening of the bolt such that they are allowed to relatively rotate, while the bolt and the washer are integrated after tightening of the bolt such that they are not allowed to relatively rotate and thus the bolt is prevented from loosening.

2. A structure for preventing loosening of a screw-fastening tool comprising a first member including a piercing hole, a second member including a screw hole, and a bolt including a head portion and a trunk, wherein the first member and the second member are tightened together by inserting the trunk of the bolt through the piercing hole of the first member, screwing the same into the screw hole of the second member and tightening the bolt, wherein a first and a second washers are disposed between the head portion of the bolt and the first member, the first washer including a projecting portion that is inserted into a clearance formed between the trunk of the bolt and the piercing hole of the first member, a height of the projecting portion being larger than one-half of a difference between the diameter of the trunk of the bolt and the diameter of the piercing hole of the first member and being smaller than the difference, and the second washer including a fitting portion that fits with the head portion of the bolt, wherein the first and the second washers are not integrated during tightening of the bolt such that they are allowed to relatively rotate, while the first and the second washers are integrated after tightening of the bolt such that they are not allowed to relatively rotate and thus the bolt is prevented from loosening.

3. A structure for preventing loosening of a screw-fastening tool as set forth in claim 2, wherein the first washer is provided with engaging teeth and the second washer is provided with a claw portion, and wherein the first and the second washers are not integrated during tightening of the bolt such that they are allowed to relatively rotate by the claw portion sliding on the engaging teeth while the first and the second washers are integrated after tightening of the bolt such that they are not allowed to relatively rotate by the claw portion engaging with the engaging teeth and thus the bolt is prevented from loosening.

4. A structure for preventing loosening of a screw-fastening tool comprising a plurality of members including piercing holes, a bolt including a head portion and a trunk, and a nut, wherein the trunk of the bolt is passed through the piercing holes of the plurality of members prior to screwing the same to the nut for tightening the nut in order to tighten the plurality of members together, wherein a washer is disposed between the nut and the members, the washer including a projecting portion that is inserted into a clearance formed between the trunk of the bolt and the piercing hole of the first member, a height of the projecting portion being larger than one-half of a difference between the diameter of the trunk of the bolt and the diameter of the piercing hole of the first member and being smaller than the difference, wherein the nut and the washer are not integrated during tightening of the nut such that they are allowed to relatively rotate, while the nut and the washer are engaged after tightening of the bolt such that they are not allowed to relatively rotate and thus the nut is prevented from loosening.

5. A structure for preventing loosening of a screw-fastening tool comprising a plurality of members including piercing holes, a bolt including a head portion and a trunk, and a nut, wherein the trunk of the bolt is passed through the piercing holes of the plurality of members prior to screwing the same to the nut for tightening the nut in order to tighten the plurality of members together, wherein a first and a second washers are disposed between the nut and the piercing holes of the members, the first washer including a projecting portion that is inserted into a clearance formed between the trunk of the bolt and the piercing holes of the members, a height of the projecting portion being larger than one-half of a difference between the diameter of the trunk of the bolt and the diameter of the piercing hole of the first member and being smaller than the difference, and the second washer including a fitting portion that fits with the nut, wherein the first and the second washers are not integrated during tightening of the nut such that they are allowed to relatively rotate, while the first and the second washers are integrated after tightening of the nut such that they are not allowed to relatively rotate and thus the nut is prevented from loosening.

6. A structure for preventing loosening of a screw-fastening tool as set forth in claim 5, wherein the first washer is provided with engaging teeth and the second washer is provided with a claw portion, and wherein the first and the second washers are not integrated during tightening of the nut such that they are allowed to relatively rotate by the claw portion sliding on the engaging teeth while the first and the second washers are integrated after tightening of the nut such that they are not allowed to relatively rotate by the claw portion engaging with the engaging teeth and thus the nut is prevented from loosening.

* * * * *